(12) United States Patent
Cork

(10) Patent No.: US 7,655,309 B2
(45) Date of Patent: Feb. 2, 2010

(54) ISOCYANATE-REACTIVE COMPONENT FOR PREPARING A POLYURETHANE-POLYUREA POLYMER

(75) Inventor: Michael S. Cork, Richardson, TX (US)

(73) Assignee: Specialty Products, Inc., Lakewood, WA (US)

( * ) Notice: Subject to any disclaimer, the term of this patent is extended or adjusted under 35 U.S.C. 154(b) by 205 days.

(21) Appl. No.: 10/980,217

(22) Filed: Nov. 3, 2004

(65) Prior Publication Data

US 2006/0058491 A1    Mar. 16, 2006

Related U.S. Application Data

(60) Provisional application No. 60/611,124, filed on Sep. 15, 2004.

(51) Int. Cl.
*B32B 27/28* (2006.01)

(52) U.S. Cl. .......... 428/423.1; 427/133; 427/372.2; 427/384; 427/445; 428/419; 428/704; 528/59; 528/65; 528/66; 528/76; 528/77; 528/85

(58) Field of Classification Search .......... 528/59, 528/65, 66, 76, 77, 85; 427/133, 372.2, 384, 427/445; 428/419, 423.1, 704
See application file for complete search history.

(56) References Cited

U.S. PATENT DOCUMENTS

| 4,377,256 | A |   | 3/1983 | Commette et al. |         |
|-----------|---|---|--------|-----------------|---------|
| 4,523,696 | A |   | 6/1985 | Commette et al. |         |
| 4,657,964 | A | * | 4/1987 | Lai et al.      | 524/409 |
| 4,797,463 | A | * | 1/1989 | Grimm et al.    | 528/60  |
| 5,679,756 | A |   | 10/1997| Zhu et al.      |         |
| 6,013,755 | A |   | 1/2000 | Primeaux, II et al. |     |
| 6,403,752 | B1|   | 1/2002 | House et al.    |         |
| 6,482,333 | B1|   | 1/2002 | Roesler et al.  |         |
| 6,509,434 | B1|   | 1/2003 | Brown et al.    |         |
| 6,562,932 | B1|   | 5/2003 | Markusch et al. |         |
| 6,887,401 | B2| * | 5/2005 | Keita et al.    | 264/1.1 |
| 2002/0103289 | A1 | | 8/2002 | Sawitski, Jr. et al. |    |

FOREIGN PATENT DOCUMENTS

WO    PCT/US05/33209    8/2008

OTHER PUBLICATIONS

Guan, Shiwei. "One Hundred Percent Solids Aliphatic Polyurethane Coatings—From Dream to Reality", Article from www.geocities.com/pucoating, Date Unknown.
Lucke, Heinz. "Aliphatic Polysulfides: Monograph of an Elastomer", 1994, Huthig & Wepf Verlag Basel, New York.
Oertel, Gunter. "Polyurethane Handbook", 1994, Hanser Publishers, New York.
Specialty Products, Inc. "It's About Time!", Sep. 2003 issue of Coatings-Pro.
Squiller, Edward P. "Aliphatic Polyurea Coatings Based on Polyaspartic Esters", Article published by Bayer Corporation, Date Unkown.

* cited by examiner

*Primary Examiner*—John Cooney
(74) *Attorney, Agent, or Firm*—Scott T. Griggs; Griggs Bergen LLP

(57) ABSTRACT

An isocyanate-reactive component is disclosed that reacts with a liquid polyisocyanate or polyisocyanate prepolymer in the preparation of a polyurethane-polyurea polymer. In one embodiment, a polyisocyanate component is reacted with an isocyanate-reactive component. The polyisocyanate component has an NCO group content of about 3% to about 50% and an average functionality of about 2 to about 3. The isocyanate-reactive component includes from about 20% to about 90% by weight, based on 100% by weight of the isocyanate-reactive component, of at least one organic compound having a mercaptan functional moiety.

4 Claims, No Drawings

ISOCYANATE-REACTIVE COMPONENT FOR PREPARING A POLYURETHANE-POLYUREA POLYMER

PRIORITY STATEMENT & CROSS-REFERENCE TO RELATED APPLICATIONS

This application claims priority from co-pending U.S. Patent Application No. 60/611,124, entitled "Polyurethane-polyurea Polymer" and filed on Sep. 15, 2004, in the name of Michael S. Cork. This application discloses subject matter related to the subject matter disclosed in the following commonly owned, co-pending patent applications: (1) "Polyisocyanate Prepolymer Component for Preparing a Polyurethane-polyurea Polymer," filed on Nov. 3, 2004, application Ser. No. 10/980,456, in the name of Michael S. Cork; and (2) "System and Method for Coating a Substrate," filed on Nov. 3, 2004, application Ser. No. 10/980,457, in the name of Michael S. Cork; both of which are hereby incorporated by reference for all purposes.

TECHNICAL FIELD OF THE INVENTION

This invention relates, in general, to polyurethane-polyurea polymers and, in particular, to an isocyanate-reactive component that reacts with a liquid polyisocyanate or polyisocyanate prepolymer to synthesize a polyurethane-polyurea polymer.

BACKGROUND OF THE INVENTION

Polyurethanes and related polyureas are used in a wide variety of applications, including fibers (particularly the elastic type), adhesives, coatings, elastomers, and flexible and rigid foams. A number of methods have been employed to prepare polyurethanes and polyureas. For example, in industrial applications, polyurethane-polyurea polymers are typically synthesized by the condensation reaction of a polyisocyanate, such as diphenylmethane diisocyanate, and a resin that includes a hydroxyl-containing material. Resins may also include linear polyesters, polyethers containing hydroxyl groups, amine-substituted aromatics, and aliphatic amines. The resulting polyurethane-polyurea polymer provides resistance to abrasion, weathering, and organic solvents and may be utilized in a variety of industrial applications as a sealant, caulking agent, or lining, for example.

It has been found, however, that the existing polyurethane-polyurea polymers are not necessarily successful in aggressive environments. The existing polyurethane-polyurea polymers exhibit insufficient chemical and/or permeability resistance when placed into prolonged contact with organic reagents such as fuels and organic solvents. Accordingly, further improvements are warranted in the preparation of polyurethane-polyurea polymers.

SUMMARY OF THE INVENTION

An isocyanate-reactive component is disclosed that reacts with a liquid polyisocyanate or polyisocyanate prepolymer in the preparation of a polyurethane-polyurea polymer. The isocyanate-reactive component includes mercaptan functional moieties and the resulting polyurethane-polyurea polymer performs well in all environments. In particular, the polyurethane-polyurea polymer prepared according to the teachings presented herein exhibits improved chemical resistance and/or impermeability in the presence of organic reagents.

In one embodiment, a polyisocyanate component is reacted with an isocyanate-reactive component. The polyisocyanate component has an NCO group content of about 3% to about 50% and an average functionality of about 2 to about 3. The isocyanate-reactive component includes from about 20% to about 90% by weight, based on 100% by weight of the isocyanate-reactive component, of at least one organic compound having a mercaptan functional moiety.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

The polyurethane-polyurea polymer may be formulated as an A-side, or polyisocyanate component, and a B-side, which may be referred to as a resin or isocyanate-reactive component. In one embodiment, the polyurethane-polyurea polymer is synthesized using a high-pressure impingement mixing technique wherein a metered amount of the polyisocyanate component and a metered amount of the isocyanate-reactive component are sprayed or impinged into each other in the mix head of a high-pressure impingement mixing machine using pressures between 2,000 psi and 3,000 psi and temperatures in the range of about 145° F. to about 190° F. (about 63° C. to about 88° C.). The mixed formulation immediately exits the mix head into a mold to form a cast polyurethane-polyurea elastomer or as a spray to form a polyurethane-polyurea polymer coating on a substrate. It should be appreciated that the polyisocyanate component and the isocyanate-reactive component may be mixed in ratios other than 1:1. For example, the mixing ratios between the polyisocyanate component and the isocyanate-reactive component may range from 1:10 to 10:1. Additionally, various types of plural component spray equipment may be employed in the preparation of the polyurethane-polyurea polymer. Further details concerning the applications of the polyurethane-polyurea polymer may be found in the following commonly owned, co-pending application: "System and Method for Coating a Substrate," filed on Nov. 3, 2004, application Ser. No. 10/980,457, in the name of Michael S. Cork; which is hereby incorporated by reference for all purposes. The overall synthesis of the polyurethane-polyurea polymer is very fast and the pot lives of successful formulations and tack free time are short compared to coating formulations that are applied as powders and then heated to melt the powders into coatings.

The polyisocyanate component has an NCO group content of about 3% to about 50% and an average functionality of about 2 to about 3. Preferably, the polyisocyanate component has an NCO group content of about 13% to about 24%. The polyisocyanate component may be either a liquid polyisocyanate or a polyisocyanate prepolymer. Suitable polyisocyanate reactants used in the polyisocyanate component, whether the polyisocyanate component is a liquid polyisocyanate or a polyisocyanate prepolymer, include polyisocyanates, which are compounds with two or more isocyanate groups in the molecule, having aliphatic, cycloaliphatic, or aromatic molecular backbones.

Examples of suitable aliphatic polyisocyanates include aralkyl diisocyanates, such as the tetramethylxylyl diisocyanates, and polymethylene isocyanates, such as 1,4-tetramethylene diisocyanate, 1,5-pentamethylene diisocyanate, hexamethylene diisocyanates (HDIs or HMDIs), 1,6-HDI, 1,7-heptamethylene diisocyanate, 2,2,4-and 2,4,4-trimethyl-hexamethylene diisocyanate, 1,10-decamethylene diisocyanate and 2-methyl-1,5-pentamethylene diisocyanate. Additional suitable aliphatic polyisocyanates include 3-isocyanatomethyl-3,5,5-trimethylcyclohexl isocyanate, bis(4-isocyanatocyclohexyl)methane, 3,3,5-trimethyl-5-isocyanato-methyl-cyclohexyl isocyanate, which is isophorone diisocyanate (IPDI), 1,4-cyclohexane diisocyanate, m-tetramethylxylene diisocyanate, 4,4'-dicyclohexlmethane diisocyanate, and hydrogenated materials such as cyclohexylene diisocyanate and 4,4'-methylenedicyclohexyl diisocyanate (H12MDI). Suitable aliphatic isocyanates also include ethylene diisocyanate and 1,12-dodecane diisocyanate.

Cycloaliphatic isocyanates that are suitable include cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane, 2,4'-dicyclohexylmethane diisocyanate, and 4,4'-dicyclohexylmethane diisocyanate.

Aromatic polyisocyanates that are suitable include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, and alkylated benzene diisocyanates generally. Methylene-interrupted aromatic diisocyanates such as diphenylmethane diisocyanate (MDI), especially the 4,4'-isomer including alkylated analogs such as 3,3'-dimethyl-4,4'-diphenylmethane diisocyanate and polymeric methylenediphenyl diisocyanate are also suitable. Suitable aromatic diisocyanates which may also be used include 3,3'-dimethoxy-4,4'-bisphenylenediisocyanate, 3,3'-diphenyl-4,4'-biphenylenediisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate.

It should be appreciated that the use of various oligomeric polyisocyanates (e.g., dimers, trimers, polymeric) and modified polyisocyanates (e.g., carbodiimides, uretone-imines) is also within the scope of the present teachings. Moreover, homopolymers and prepolymers incorporating one or more of these aliphatic, cyclic, and aromatic compounds or mixtures or reaction products thereof are suitable. Preferably, the polyisocyanate component includes MDI.

In formulations where the use of a polyisocyanate prepolymer is chosen over the use of a liquid polyisocyanate, a reactive component is mixed with the selected polyisocyanate or polyisocyanates to synthesize the prepolymer. The polyisocyanate prepolymer route is preferred to the liquid polyisocyanate route. Suitable organic polyols for use as the reactive component in preparing the polyurethane-polyurea prepolymer formulations consist essentially of polyether or polyester polyols of nominal functionality 2 to 3 that have molecular weights (number averaged) of from 100 g/mol to 8000 g/mol. Suitable polyether or polyester diols which can be employed as the reactive component for making the prepolymers of the invention include those which are prepared by reacting alkylene oxides, halogen-substituted or aromatic-substituted alkylene oxides or mixtures thereof with an active hydrogen-containing initiator compound. Suitable oxides include, for example, ethylene oxide, propylene oxide, 1,2-butylene oxide, styrene oxide, epichlorohydrin, epibromohydrin, and mixtures thereof. Moreover, in one embodiment, a caprolactone, such as a tri-functional polycaprolactone, is utilized as the reactive component in preparing the polyurethane-polyurea prepolymer formulations. More preferably, a blend of tri-functional compounds are utilized as the reactive component. In one implementation, glycols such as propylene glycol (and polymers thereof) are utilized in the prepolymer synthesis. In another implementation, aromatic diols, such as hydroquinone Di(beta-hydroxyethyl) ether, or hydrazines, such as hydroxyethylhydrazine (HEH), are utilized in the prepolymer synthesis. Derivatives of hydrazine such as hydrazides (e.g., adipic dihydrazide (ADH)), hydrazones, or triazoles may also be utilized. In one embodiment, mercaptan functional moieties may be incorporated into the polyisocyanate component as discussed in detail in the following commonly owned, co-pending patent application: "Polyisocyanate Prepolymer Component for Preparing a Polyurethane-polyurea Polymer," filed on Nov. 3, 2004, application Ser. No. 10/980,456, in the name of Michael S. Cork; which is hereby incorporated by reference for all purposes. It should be further appreciated that the polyisocyanate component may include additives such as non-primary components, fillers, anti-aging agents, or coloring agents, for example. Moreover, in formulations utilizing a polyisocyanate prepolymer component, a catalyst such as a tin-based catalyst may be utilized.

The isocyanate-reactive component includes from about 20% to about 90% by weight, based on 100% by weight of the isocyanate-reactive component, of at least one organic compound having a mercaptan functional moiety. Additionally, the isocyanate-reactive component includes from about 10% to about 80%, based on 100% by weight of the isocyanate-reactive component, of an intermediate resin component. The use of an isocyanate-reactive component including mercaptan functional moieties in the synthesis of a polyurethane-polyurea polymer results in a polymer having excellent tensile properties and tear strength properties, substantially no volatile organic compounds (VOCs), abrasion and weathering resistance, and electrical resistance. Additionally, the incorporation of the sulfur into the synthesized polyurethane-polyurea polymer imparts improved chemical resistance and/or reduced permeability. In one implementation, the polyurethane-polyurea polymer has a mercaptan content of about 0.5% to about 5.0%. In another implementation, the polyurethane-polyurea polymer has a mercaptan content of about 1.2% to about 2.4%.

The organic compound having a mercaptan functional moiety is preferably a polysulfide. Most preferably, the polysulfide is a thiol having the following general formula:

wherein R equals an aliphatic, cyclic, or aromatic organic compound having any arrangement of functional groups. Typically, the polysulfide will include two or more sulfur atoms and contain reactive mercaptan end-groups according to the following general formula:

wherein R' and R" are each an aliphatic, cyclic, or aromatic organic compound having any arrangement of functional groups.

Suitable polysulfides include aliphatic polysulfides (ALIPS) and polymercaptans. The formation of ALIPS occurs by way of an equilibrating polycondensation reaction from bifunctional organic compounds such as dihalogen alkanes or dihalogen ether and alkali metal polysulfide solution. Suitable ALIPS include THIOPLAST™ polysulfides manufactured by Akzo Nobel Inc. (Chicago, Ill.) and THIOKOL® polysulfides manufactured by Toray Industries, Inc. (Tokyo, Japan).

THIOPLAST™ polysulfides, which are the most preferable polysulfides, result from the polycondensation of bis-(2-chloroethyl-)formal with alkali polysulfide. This reaction generates long-chain macromolecules which are cut to the required chain length by reductive splitting with sodium dithionite. The disulfide groups are at the same converted into reactive thiol terminal groups. By introducing a trifunctional component (e.g., 1,2,3-trichloropropane) during synthesis a third thiol terminal group can be added to a specific number of molecules to determine the extent of cross-linking during the curing process. The following tables, Tables I-III, provide a survey of the chemical properties of suitable THIOPLAST™ polysulfides.

TABLE I

Chemical Survey of THIOPLAST ™ G10, G112, and G131 Polysulfides

| | THIOPLAST ™ Type | | |
|---|---|---|---|
| | G10 | G112 | G131 |
| Molecular Weight (g/mol) | 4,400-4,700 | 3,900-4,300 | 5,000-6,500 |
| Mercaptan Content (%) | 1.4-1.5 | 1.5-1.7 | 1.0-1.3 |

TABLE II

Chemical Survey of THIOPLAST ™ G1, G12, and G21 Polysulfides

| | THIOPLAST ™ Type | | |
|---|---|---|---|
| | G1 | G12 | G21 |
| Molecular Weight (g/mol) | 3,300-3,700 | 3,900-4,400 | 2,100-2,600 |
| Mercaptan Content (%) | 1.8-2.0 | 1.5-1.7 | 2.5-3.1 |

TABLE III

Chemical Survey of THIOPLAST ™ G22, G44, and G4 Polysulfides

| | THIOPLAST ™ Type | | |
|---|---|---|---|
| | G22 | G44 | G4 |
| Molecular Weight (g/mol) | 2,400-3,100 | <1,100 | <1,100 |
| Mercaptan Content (%) | 2.1-2.7 | >5.9 | >5.9 |

As previously mentioned, THIOKOL® polysulfides are also suitable ALIPS. The following tables, Tables IV-VI, provide a survey of the chemical properties of suitable THIOKOL® polysulfides.

TABLE IV

Chemical Survey of THIOKOL ® LP-33, LP-3, and LP-541 Polysulfides

| | THIOKOL ® Type | | |
|---|---|---|---|
| | LP-33 | LP-3 | LP-541 |
| Molecular Weight (g/mol) | 1,000 | 1,000 | 4,000 |
| Mercaptan Content (%) | 5.0-6.5 | 5.9-7.7 | 1.5-1.7 |

TABLE V

Chemical Survey of THIOKOL ® LP-12 C, LP-32 C, and LP-2 C Polysulfides

| | THIOKOL ® Type | | |
|---|---|---|---|
| | LP-12 C | LP-32 C | LP-2 C |
| Molecular Weight (g/mol) | 4,000 | 4,000 | 4,000 |
| Mercaptan Content (%) | 1.5-1.7 | 1.5-2.0 | 1.7-2.2 |

TABLE VI

Chemical Survey of THIOKOL ® LP-31, LP-977 C, and LP-980 C Polysulfides

| | THIOKOL ® Type | | |
|---|---|---|---|
| | LP-31 | LP-977 C | LP-980 C |
| Molecular Weight (g/mol) | 8,000 | 2,500 | 2,500 |
| Mercaptan Content (%) | 1.0-1.5 | 2.8-3.5 | 2.5-3.5 |

As previously discussed, polymercaptans are also suitable polysulfides. Polymercaptans are formed from aliphatic, cyclo-aliphatic, or aromatic molecular segments, which can also contain individual sulfur atoms, e.g., in the form of thioether or similar compounds, but which have no disulfide bridges and which have reactive mercaptan groups according to the general formula:

$$HS-R_n-SH$$

where R equals acrylate, butadiene, butadiene acrylonitrile, or other suitable compound. In addition to the mercaptan end-groups, the polymercaptans may include hydroxyl end-groups, olefin end-groups, alkoxysilyl end-groups, or alkyl end-groups, for example. The following listing provides examples of suitable polymercaptans.

BAYTHIOL® is a mercaptan-terminated polyurethane from Bayer AG (Leverkusen, Germany).

HYCAR® MTA is a mercaptan-terminated acrylate-polymerisate from B.F. Goodrich Chemical Corporation (Cleveland, Ohio).

HYCAR® MTB is a mercaptan-terminated butadiene-polymerisate from B.F. Goodrich Chemical Corporation (Cleveland, Ohio).

HYCAR® MTBN (1300×10) is a mercaptan-terminated butadiene-acrylnitrile-co-polymerisate from B.F. Goodrich Chemical Corporation (Cleveland, Ohio).

PERMAPOL® P-2 is a mercaptan-terminated liquid polymer from Product Research Corporation (Glendale, Calif.).

PERMAPOL® P-3 is a mercaptan-terminated liquid polymer from Product Research Corporation (Glendale, Calif.).

PERMAPOL® P-5 is a chemically-modified ALIPS from Product Research Corporation (Glendale, Calif.).

PM® polymer is a mercaptan-terminated liquid polymer from Philips Chemical Corporation (Bartlesville, Okla.).

The intermediate resin component may include suitable initiator compounds comprising relatively low molecular weight species containing two active hydrogen atoms, ethylene glycol, propylene glycol, 1,4-butanediol, butenediol, butynediol, hexanediol, bisphenols, diethylene glycol, dipropylene glycol, tripropylene glycol, triethylene glycol, mixtures of these, and like difunctional active hydrogen species. Additionally, the intermediate resin component may include aliphatic amines and amine-substituted aromatics. By way of example, suitable intermediate resin components include diethylthtoluenediamine, diaminodiphenylmethane, polyoxypropylenediamine, secondary aliphatic diamines, cycloaliphatic diamines, and mixtures and reaction products thereof. Suitable secondary aliphatic diamines include polyaspartic ester compounds such as the Desmophen® polyaspartic esters from Bayer AG (Leverkusen, Germany) Sulfur diamines such as di-(methylthio)toluenediamine are suitable as well. Diethyltoluenediamine, diaminodiphenylmethane, and di-(methylthio) toluenediamine are preferred intermediate resin components. Once the intermediate resin component is selected, the polysulfide and intermediate resin component are mixed together to create the isocyanate-reactive component. It should be appreciated that additives such as non-primary components, fillers, anti-aging agents, or coloring agents, as well as catalysts, may be utilized in the preparation of the isocyanate-reactive component.

The present invention will now be illustrated by reference to the following non-limiting working examples wherein procedures and materials are solely representative of those which can be employed, and are not exhaustive of those available and operative. The following glossary enumerates the components utilized in the Examples and Test Methods presented hereinbelow.

CAPA® 3091 polyol is a 900 g/mol molecular weight caprolactone polyol from Solvay S. A. (Brussels, Belgium).

Castor oil is derived from the seeds of the castor bean, *Ricinus communis*, and is readily available.

DESMODUR® Z 4470 BA IPDI is an IPDI trimer from Bayer Corporation (Pittsburgh, Pa.).

ETHACURE® 100 curing agent is diethyltoluenediamine (DETA) from Albemarle Corporation (Baton Rouge, La.).

ETHACURE® 300 curing agent is di-(methylthio)toluenediamine (DMTDA) from Albermarle Corporation (Baton Rouge, La.).

GLYMO™ silane is 3-glycidoxypropyl trimethoxysilane from Degussa AG (Frankfort, Germany).

JEFFAMINE® D-2000 polyoxypropylenediamine is a difunctional primary amine having an average molecular weight of 2000 g/mol from Huntsman LLC (Salt Lake City, Utah).

JEFFAMINE® T-5000 polyol is a primary polyether triamine of approximately 5000 g/mol molecular weight from Huntsman LLC (Salt Lake City, Utah).

JEFFLINK® 754 diamine is a bis(secondary amine) cycloaliphatic diamine from Huntsman LLC (Salt Lake City, Utah).

JEFFOX® PPG-230 glycol is a 230 g/mol molecular weight polyoxyalkylene glycol from Huntsman LLC (Salt Lake City, Utah).

JEFFSOL® propylene carbonate is a propylene carbonate from Huntsman LLC (Salt Lake City, Utah).

METACURE® T-12 catalyst is a dibutyltin dilaurate catalyst from Air Products and Chemicals, Inc. (Allentown, Pa.).

MONDUR® ML MDI is an isomer mixture of MDI from Bayer Corporation (Pittsburgh, Pa.) that contains a high percentage of the 2'4 MDI isomer.

POLY-T® 309 polyol is a 900 g/mol molecular weight tri-functional polycaprolactone from Arch Chemicals, Inc. (Norwalk, Conn.).

PPG-2000™ polymer is a 2000 g/mol molecular weight polymer of propylene oxide from The Dow Chemical Company (Midland, Mich.).

RUBINATE® M MDI is a polymeric MDI from Huntsman LLC (Salt Lake City, Utah) which is prepared by the phosgenation of mixed aromatic amines obtained from the condensation of aniline with formaldehyde.

THIOPLAST™ G4 polysulfide is a less than 1000 g/mol molecular weight polysulfide from Akzo Nobel Inc. (Chicago, Ill.).

THIOPLAST™ G22 polysulfide is a 2400-3100 g/mol molecular weight polysulfide from Akzo Nobel Inc. (Chicago, Ill.).

TOLONATE® HDT-LV2 isocyanate is a tri-functional 1,6-hexamethylene diisocyanate-based polyisocyanate from Rhodia Inc. (Cranbury, N.J.).

TMXDI™ isocyanate is tetramethylenexylene diisocyanate from Cytec Industries, Inc. (West Paterson, N.J.).

UNILINK™ 4200 diamine is a 310 g/mol molecular weight 2-functional aromatic diamine from Dorf Ketal Chemicals, LLC (Stafford, Tex.) (formerly from UOP Molecular Sieves (Des Plaines, Ill.)).

Example I. An A-side prepolymer is made by reacting 2010 g of DESMODUR® Z 4470 BA IPDI with 900 g of POLY-T® 309 polyol and 160 g of TMXDI™ isocyanate. The ingredients are mixed vigorously for 5 minutes at a speed that is short of forming a vortex. Two grams of METACURE® T-12 catalyst are added and the ingredients are mixed for 3.5 hours under a blanket of inert nitrogen gas ($N_2$). A blanket of argon gas (Ar) or mild vacuum conditions are also suitable. It should be noted that 140° F. (60° C.) of heat may be substituted for the tin (Sn) catalyst. The A-side prepolymer formation is then complete. To the resulting A-side prepolymer, 250 g of JEFFSOL® propylene carbonate, which acts as a diluent, and 400 g of TOLONATE® HDT-LV2 isocyanate are added. The ingredients are mixed for 1 hour and the A-side formation is complete.

A B-side resin is formed by mixing 1295 g of JEFFLINK® 754 diamine with 740 g of THIOPLAST™ G22 polysulfide and 1665 g of THIOPLAST™ G4 polysulfide. The ingredients are stirred at ambient conditions until well mixed. A tertiary type amine catalyst may be utilized to increase the rate of the reaction. The B-side resin formation is then complete. The A-Side and the B-side are then loaded into a GX-7 spray gun, which is manufactured by Gusmer Corporation (Lakewood, NJ), and impinged into each other at a 1:1 ratio at 2500 psi and 170° F. (77° C.). The resulting polymer gels in approximately 6 seconds and is tack free in approximately 11 seconds. Further, the polyurethane-polyurea polymer has a mercaptan content between 1.3% and 2.2%.

Example II. The polyurethane-polyurea polymer was prepared substantially according to the procedures presented in Example I with the components noted in Table VII. The resulting polyurethane-polyurea polymer has a mercaptan content between 1.2% and 1.9%.

TABLE VII

| Polymer Formation (Example II) | |
|---|---|
| A-side | B-side |
| 66% by wt of MONDUR ® ML MDI | 13% by wt of ETHACURE ® 100 curing agent |
| 3% by wt of RUBINATE ® M MDI | 5% by wt of ETHACURE ® 300 curing agent |
| 25% by wt of POLY-T ® 309 polyol | 19% by wt of UNILINK ™ 4200 diamine |
| 4% by wt of GLYMO ™ silane | 33% by wt of THIOPLAST ™ G22 polysulfide |
| 2% by wt of additives (e.g., color control additives) | 30% by wt of THIOPLAST ™ G4 polysulfide |

Example III. The polyurethane-polyurea polymer was prepared substantially according to the procedures presented in Example I with the components noted in Table VIII. The resulting polyurethane-polyurea polymer has a mercaptan content between 1.2% and 2.0%.

TABLE VIII

Polymer Formation (Example III)

| A-side | B-side |
|---|---|
| 52.5% by wt of MONDUR ® ML MDI | 10% by wt of ETHACURE ® 100 curing agent |
| 2.25% by wt of RUBINATE ® M MDI | 26% by wt of UNILINK ™ 4200 diamine |
| 20.25% by wt of POLY-T ® 309 polyol (CAPA ® 3091 polyol is a suitable alternative) | 34% by wt of THIOPLAST ™ G22 polysulfide |
| 45% by wt of TOLONATE ® HDT-LV2 isocyanate | 30% by wt of THIOPLAST ™ G4 polysulfide |

Example IV. The polyurethane-polyurea polymer was prepared substantially according to the procedures presented in Example I with the components noted in Table IX. The resulting polyurethane-polyurea polymer has a mercaptan content between 1.4% and 2.3%.

TABLE IX

Polymer Formation (Example IV)

| A-side | B-side |
|---|---|
| 70.5% by wt of MONDUR ® ML MDI | 35% by wt of JEFFOX ® PPG-230 glycol |
| 26% by wt of POLY-T ® 309 polyol | 25% by wt of THIOPLAST ™ G22 polysulfide |
| 3.5% JEFFSOL ® propylene carbonate | 40% by wt of THIOPLAST ™ G4 polysulfide |

Example V. The polyu-rethane-polyurea polymer was prepared substantially according to the procedures presented in Example I with the components noted in Table X. The resulting polyurethane-polyurea polymer has a mercaptan content between 1.9% and 3.3%.

TABLE X

Polymer Formation (Example V)

| A-side | B-side |
|---|---|
| 66.5% by wt of MONDUR ® ML MDI | 25% by wt of ETHACURE ® 100 curing agent |
| 16.75% by wt of PPG-2000 ™ polymer | 65% by wt of THIOPLAST ™ G4 polysulfide |
| 16.75% by wt of Castor oil | 10% by wt of JEFFAMINE ® T-5000 polyol |

Example VI. The polyurethane-polyurea polymer was prepared substantially according to the procedures presented in Example I with the components noted in Table XI. The resulting polyurethane-polyurea polymer has a mercaptan content between 2.1% and 3.5%.

TABLE XI

Polymer Formation (Example VI)

| A-side | B-side |
|---|---|
| 77% by wt of MONDUR ® ML MDI | 13.5% by wt of ETHACURE ® 100 curing agent |

TABLE XI-continued

Polymer Formation (Example VI)

| A-side | B-side |
|---|---|
| 23% by wt of Castor oil | 70.5% by wt of THIOPLAST ™ G4 polysulfide |
| | 16% by wt of UNILINK ™ 4200 diamine |

Example VII. The polyurethane-polyurea polymer was prepared substantially according to the procedures presented in Example I with the components noted in Table XII. The resulting polyurethane-polyurea polymer has a mercaptan content between 2.1% and 3.5%.

TABLE XII

Polymer Formation (Example VII)

| A-side | B-side |
|---|---|
| 70% by wt of MONDUR ® ML MDI | 13.5% by wt of ETHACURE ® 100 curing agent |
| 4% by wt of RUBINATE ® M MDI | 70.5% by wt of THIOPLAST ™ G4 polysulfide |
| 26% by wt of POLY-T ® polyol | 16% by wt of UNILINK ™ 4200 diamine |

The foregoing Examples I-VII of the present invention were tested against a high-tensile strength standard polyurea (HTS-SP) of conventional preparation having components noted in Table XIII.

TABLE XIII

Formation of HTS-SP

| A-side | B-side |
|---|---|
| 60% by wt of MONDUR ® ML MDI | 25% by wt of ETHACURE ® 100 curing agent |
| 40% by wt of PPG-2000 ™ polymer | 10% by wt of JEFFAMINE ® T-5000 polyol |
| | 70% by wt of JEFFAMINE ® D-2000 polyoxypropylenediamine |

Test Method I. A polyurethane-polyurea polymer of the present invention synthesized in accordance with Example V (Ex. V Polymer) and the HTS-SP were tested according to the standard test method for tensile properties of plastics prescribed in American Society for Testing and Materials (ASTM) D638. This test method covers the determination of the tensile properties of unreinforced and reinforced plastics in the form of standard dumbbell-shaped test specimens when tested under defined conditions of pretreatment, temperature, humidity, and testing machine speed. Table XIV depicts the ASTM D638 test results for the Ex. V Polymer and the HTS-SP.

TABLE XIV

ASTM D638 Test Results

| Polymer | Mean Yield Stress (psi) | Mean Maximum Strain (%) | Mean Young's Modulus (psi) |
|---|---|---|---|
| Ex. V Polymer | 2,419 | 110 | 28,414 |
| HTS-SP | 1,024 | 561 | 10,768 |

Test Method II. The Ex. V Polymer and the HTS-SP were tested according to the standard test method for water transmission of materials prescribed in ASTM E96. This test method covers the determination of water vapor transmission of materials through which the passage of water vapor may be of importance. Table XV depicts the ASTM E96 test results for the Ex. V Polymer and the HTS-SP.

TABLE XV

ASTM E96 Test Results

| Polymer | Mean Permeance (perms) | Mean Average Permeability (perms-in) |
|---|---|---|
| Ex. V Polymer | 0.204 | 0.007 |
| HTS-SP | 1.632 | 0.066 |

Test Method III. The Ex. V Polymer and the HTS-SP were tested according to the standard test method for tear strength of conventional vulcanized rubber and thermoplastic elastomers prescribed in ASTM D624. This test method describes procedures for measuring a property of conventional vulcanized thermoset rubber and thermoplastic elastomers called tear strength. Table XVI depicts the ASTM D624 test results for the Ex. V Polymer and the HTS-SP.

TABLE XVI

ASTM D624 Test Results

| Polymer | Maximum Load (lbs) | Tear PLI (lbs/lin in) |
|---|---|---|
| Ex. V Polymer | 15.47 | 449.6 |
| HTS-SP | 16.13 | 476.2 |

Testing Method IV. A polyurethane-polyurea polymer of the present invention synthesized in accordance with Example III (Ex. III Polymer), the HTS-SP, and a conventional polyurea were tested to evaluate resistance to chemical reagents and, in particular, resistance to gasoline, xylene, and diesel fuel. Each of polymers under evaluation was sealed in a glass receptacle containing one of the three test fluids for 30 days at ambient conditions. At the end of the 30 days, change in weight was recorded. Table XVII depicts the Chemical Resistance test results, i.e., percent weight increase, for the Ex. III Polymer, the HTS-SP, and the conventional polyurea (CP).

TABLE XVII

Chemical Resistance Test Results

| Polymer | Gasoline (% wt inc.) | Xylene (% wt inc.) | Diesel Fuel (% wt inc.) |
|---|---|---|---|
| Ex. III Polymer | 1.4 | 8.7 | 0.7 |
| HTS-SP | 26.3 | 37.1 | 10.9 |
| CP | 69.1 | 110.3 | 21.4 |

After 30 days, the test fluid in each of the three receptacles housing the Ex. III Polymer was exchanged out and the testing continued. After a total of 120 days, weight increases of the Ex. III Polymer were 4.8%, 11.6%, and 1.4% for gasoline, xylene, and diesel fuel, respectively. Additionally, the Ex. I-II and IV-VII Polymers exhibited chemical resistance with respect to gasoline, xylene, and diesel fuel substantially equivalent to the Ex. III Polymer. Accordingly, the results of Testing Methods I-IV illustrate that the polyurethane-polyurea polymers having the mercaptan functional moieties in accordance with the teachings presented herein exhibit physical properties that are equivalent or better than those of existing polyurethane-polyurea polymers. Further, the polyurethane-polyurea polymers synthesized according to the teachings presented herein exhibit chemical resistance at least an order of magnitude better than existing polyurethane-polyurea polymers.

What is claimed is:

1. A process for preparing a polymer that coats a substrate, comprising:
   providing a polyisocyanate component including aromatic isocyanates, the polyisocyanate component having an NCO group content of about 3% to about 50% and an average functionality of about 2 to about 3;
   providing an isocyanate-reactive component, the isocyanate-reactive component including amines selected from the group consisting of aromatic primary and secondary amines and aliphatic primary and secondary amines, and from about 20% to about 90% by weight, based on 100% by weight of the isocyanate-reactive component, of at least one polysulfide compound having hydrosulfide (—SH) terminations, the isocyanate-reactive component having an NCO group content of 0%;
   reacting the polyisocyanate component and the isocyanate-reactive component using a high-pressure impingement mixing technique at a temperature in a range of about 145° F. to about 190° F.; and
   coating the substrate with the reaction product.

2. The process as recited in claim 1, wherein the polyisocyanate component and the isocyanate-reactive component are reacted in approximately a 1:1 ratio.

3. The process as recited in claim 1, wherein the polyisocyanate component comprises a reaction product of diphenylmethane diisocyanate and caprolactone.

4. The process as recited in claim 1, wherein the isocyanate-reactive component comprises a reaction product of diethyltoluenediamine and an aromatic diamine.

* * * * *